US009644660B2

(12) United States Patent
    Garver

(10) Patent No.: US 9,644,660 B2
(45) Date of Patent: *May 9, 2017

(54) ASSEMBLY IMPROVING, LOW MASS, FASTENER HEAD

(71) Applicant: MAThread Inc., Wixom, MI (US)

(72) Inventor: Michael Garver, Wixom, MI (US)

(73) Assignee: MATHREAD INC., Wixom, MI (US)

( * ) Notice: Subject to any disclaimer, the term of this patent is extended or adjusted under 35 U.S.C. 154(b) by 277 days.

This patent is subject to a terminal disclaimer.

(21) Appl. No.: 14/265,757

(22) Filed: Apr. 30, 2014

(65) Prior Publication Data

US 2014/0234051 A1   Aug. 21, 2014

Related U.S. Application Data

(63) Continuation of application No. 13/055,490, filed as application No. PCT/US2009/052371 on Jul. 31, 2009, now Pat. No. 8,747,044.

(60) Provisional application No. 61/085,219, filed on Jul. 31, 2008.

(51) Int. Cl.
    *F16B 23/00*   (2006.01)
(52) U.S. Cl.
    CPC ...... *F16B 23/0007* (2013.01); *F16B 23/0038* (2013.01)
(58) Field of Classification Search
    CPC combination set(s) only.
    See application file for complete search history.

(56) References Cited

U.S. PATENT DOCUMENTS

| 2,509,980 | A |   | 5/1950  | Mccallum  | 36/62      |
|-----------|---|---|---------|-----------|------------|
| 2,770,998 | A |   | 11/1956 | Schwartz  | 411/403    |
| 3,470,786 | A |   | 10/1969 | Martins   |            |
| 3,584,667 | A |   | 6/1971  | Reiland   | 81/460     |
| 3,930,428 | A | * | 1/1976  | Hale      | B25B 13/485 |
|           |   |   |         |           | 411/402    |
| D243,580  | S |   | 3/1977  | Decaro    | D8/388     |

(Continued)

FOREIGN PATENT DOCUMENTS

| AT | 388215 B    | 5/1989 | ............ B25B 13/06 |
| CN | 101223370 A | 7/2008 | ............ F16B 23/00 |

(Continued)

OTHER PUBLICATIONS

Canadian Office Action, Application No. 2732431, 4 pages, Apr. 20, 2015.

(Continued)

*Primary Examiner* — Gary Estremsky
(74) *Attorney, Agent, or Firm* — Slayden Grubert Beard PLLC

(57) ABSTRACT

An assembly improving, lower mass fastener head that is easier to handle and reduces the amount of material that is required in manufacturing the fastener comprises three lugs at multiples of 60 degrees around an axis of a threaded body. Those portions of a hex head that are not necessary for application and transmission of torque, nor necessary to resist axial loading, nor necessary to axially stabilize the fastener head within current driving tooling may be removed. Compatibility with existing hex head tools is maintained while improving handling of the fastener by an assembler and reducing material used in the fastener head.

12 Claims, 18 Drawing Sheets

(56) References Cited

U.S. PATENT DOCUMENTS

| | | | |
|---|---|---|---|
| D245,147 S | 7/1977 | Ono | D8/387 |
| 4,073,160 A | 2/1978 | Perret | 464/158 |
| 4,228,722 A | 10/1980 | Kazino | 503/214 |
| 4,430,035 A | 2/1984 | Rodseth | 411/402 |
| 4,616,535 A | 10/1986 | Chiavon | 81/121.1 |
| 4,815,312 A | 3/1989 | Jacquet et al. | 72/454 |
| 4,869,633 A * | 9/1989 | Hayashi | B25B 13/065 301/114 |
| 4,890,967 A | 1/1990 | Rosenbaum | 411/377 |
| 5,269,208 A | 12/1993 | Kolvites et al. | 81/176.2 |
| 5,378,101 A | 1/1995 | Olson et al. | 411/405 |
| 5,628,602 A * | 5/1997 | Ohsawa | F16B 23/0061 411/405 |
| 5,730,566 A | 3/1998 | Goodwin et al. | 411/386 |
| 6,162,001 A | 12/2000 | Goodwin et al. | 411/386 |
| 6,477,923 B2 | 11/2002 | Amis | 81/121.1 |
| D551,961 S | 10/2007 | Huh | D08/397 |
| 8,747,044 B2 | 6/2014 | Garver | 411/402 |

FOREIGN PATENT DOCUMENTS

| | | | |
|---|---|---|---|
| FR | 1309208 | 11/1962 | |
| GB | 1205445 | 9/1970 | F16B 33/00 |
| JP | 55-050331 A | 9/1953 | |
| JP | 03-144107 | 6/1991 | B21K 1/46 |
| JP | 11-072109 A | 3/1999 | F16B 23/00 |
| JP | 11-509915 A | 8/1999 | F16B 33/02 |
| JP | 3072430 U | 7/2000 | H04M 3/22 |
| JP | 2001-317516 A | 11/2001 | F16B 23/00 |
| JP | 2004-076900 A | 3/2004 | B21B 13/06 |
| JP | 2007-205553 A | 8/2007 | B25B 13/02 |

OTHER PUBLICATIONS

Korean Office Action, Application No. 20117002354, 5 pages, Jun. 28, 2015.
International PCT Search Report, PCT/US2009/052371, 15 pages, Oct. 14, 2009.
European Office Action, Application No. 09791036.8-1758, 4 pages, Mar. 27, 2013.
Eurasian Office Action, Application No. 201170262/31, 2 pages, Apr. 2, 2013.
Australian Office Action, Application No. 2009276465, 3 pages, Apr. 23, 2013.
Chinese Office Action, Application No. 200980130608.3, 16 pages, Jun. 3, 2013.
Mexican Office Action, Application No. MX/a/2011/001002, 4 pages, Jun. 18, 2013.
Japanese Office Action, Application No. 2011-521349, 9 pages, Jun. 19, 2013.
Eurasian Office Action, Application No. 201170262/31, 4 pages, Dec. 4, 2013.
Korean Office Action, Application No. 2011-7002354, 12 pages, Dec. 31, 2015.
Chinese Office Action, Application No. 200980130608.3, 5 pages (Chinese w/ English translation), May 21, 2015.

* cited by examiner

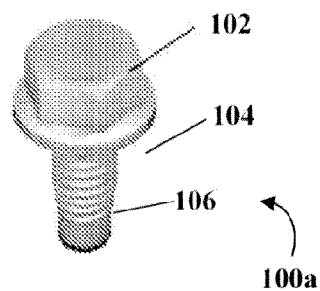
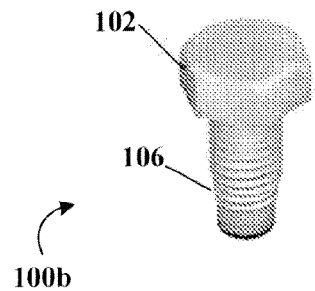
FIGURE 1(a)  FIGURE 1(b)
FIGURE 1 (Prior Technology)
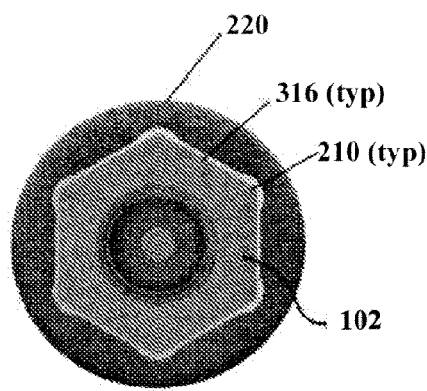
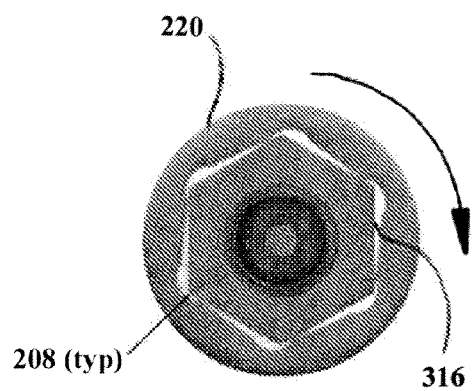
FIGURE 2(a)  FIGURE 2(b)
FIGURE 2 (Prior Technology)

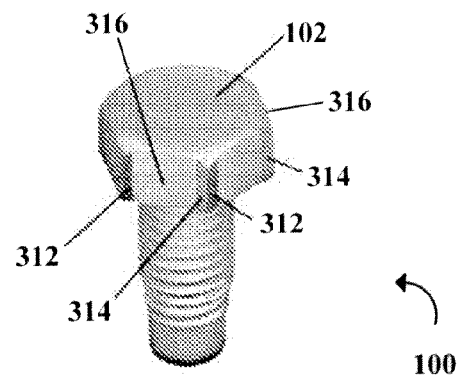
FIGURE 3 (Prior Technology)
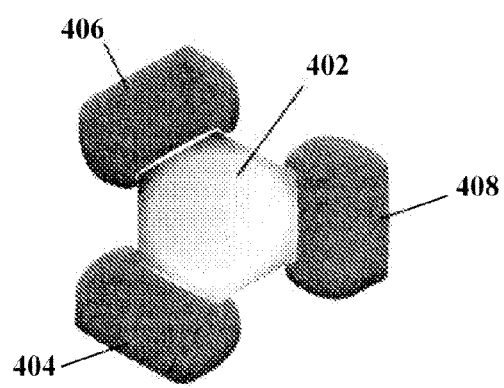
FIGURE 4 (Prior Technology)

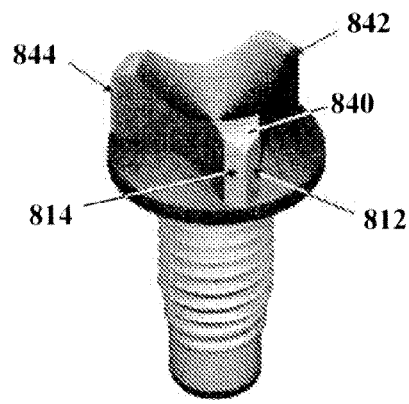
FIGURE 8(a)
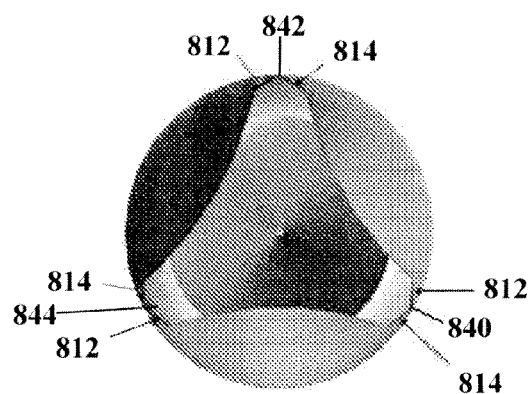
FIGURE 8(b)
FIGURE 8

ASSEMBLY IMPROVING, LOW MASS, FASTENER HEAD

CROSS-REFERENCE TO RELATED APPLICATIONS

This application is a continuation of U.S. patent application Ser. No. 13/055,490 filed on Jan. 24, 2011, which is a U.S. National Stage Application of International Application No. PCT/US2009/052371 filed Jul. 31, 2009, which designates the United States of America, and claims priority to commonly owned U.S. Provisional Patent Application Ser. No. 61/085,219; filed Jul. 31, 2008; the contents of which are hereby incorporated by reference in their entirety.

TECHNICAL FIELD

The present disclosure relates to threaded fasteners, and more particularly, to an low mass fastener head having a relatively lower amount of material that is required in manufacturing the fastener, and having a fastener head geometry that is easier to handle.

BACKGROUND

Currently in the fastener industry, the most common type of fastener head styles are the "Flanged hex head" and the "Hex head." Referring to FIGS. 1(a) and 1(b), the "flanged hex head" and the "hex head are generally represented by the numerals 100a and 100b, respectively. These head styles both utilize a hex shaped head 102 for application of driving torque. The flanged hex head utilizes an integrated flange 104 at the base of the hex shaped head 102 to enhance application and distribution of the clamp-load of the fastener 100 caused by the engagement of the threads 106 with the internal threads of the work piece (not shown).

With common hex heads, only a very small portion of each facet of the hex may be utilized for torque application. This is due to the fact that the tool utilized to drive the hex head is also hex-shaped (some are twelve-sided or other variations). Because the tool's internal hex may be slightly larger dimensionally than the hex of the fastener (in order to slip over it freely), during initial driving the tool rotates slightly before it contacts the fastener hex (see FIGS. 2(a) and 2(b)).

When such contact is made, there may only initially be a "point" contact 208 between the corners 210 of the fastener hex 102 and the internal facet of the tool, viewed down the axis of the fastener as shown in FIG. 2. As torque application continues, local deformation of the fastener's hex corners 210 may result in this contact expanding to be more of a rectangular contact point between the internal facet of the tool and the deformed facet 314 of the fastener hex 102 shown in FIG. 3. A rectangular area 312 of the facet 316 varies in size and shape depending on fastener metallurgical properties, the amount of taper in the fastener 100, and the initial gap between the tool 220 and the facets 316 of the hex head 102. The area of this contact may be no more than ten percent of the surface area of each facet 316, and it may not extend beyond approximately ten percent from any corner of the hex head 102 (where facets 316 join together).

Similar contacts may be made during loosening of the fastener 100, e.g., rotational direction opposite tightening direction, except that this contact may occur on an area 314 of the opposite end of each hex facet 312. Therefore, the contact area 314 for loosening of the fastener 100 may be the mirror image of the tightening area 312, but is located at the opposite end of each facet 316 adjacent to each corner (where the facets 316 intersect). During installation and removal, the tool 220 may not contact the centers of the facets 316, and the area around the centers. Therefore, most of the surface areas of the hex head facets 316 may never be utilized and may not be necessary for either tightening or loosening the fastener 100.

The purpose of the application of torque to a hex-shaped fastener head is to revolve the fastener 100 axially, thus causing the thread helixes of the mating parts to engage. Ultimately, the loading thusly applied is transmitted through the fastener 100 to its bearing surface, creating a spring-load in the fastened joint. Since only a small portion, e.g., facet portions 312 and 314 of the fastener hex head 102, are required, present technology fastener hex heads 102 contain much more material than required for this purpose, with that material located in places that are hardly ideal. For example, in many fastener usages, the fastener 100 is presented to its mating internally threaded part (not shown) by holding it in the fingers of one hand. Usually, this is accomplished by gripping it between the tips of the thumb, forefinger, and middle finger. The surfaces of a hex are not ideally suited for this purpose.

Further, the shape of the fastener head may be important to the ease with which the head is handled by an operator. Referring now to FIG. 4, depicted is a schematic plan diagram of a hex head fastener being grasped by representations of fingers of a hand. The hex head 402 may be grasped (e.g., gripped) by the thumb 404, forefinger 406, and middle finger 408 of one hand (not shown). During the gripping of any small object with the fingers 404, 406 and 408, the surfaces of the fingers 404, 406 and 408 presented to the hex head 402 are essentially convex curved surfaces of variable size. These surfaces are normally presented to grip the hex head 402 in a manner such that they are essentially equally distributed about the hex head 402 at approximately 120 degrees apart. As the hex head 402 is grasped, the convex curved surfaces of the fingers 404, 406 and 408 may deform to match the contour of the surfaces being grasped so that it may be relatively more "finger friendly."

These problems, among others, result in fasteners which are heavier, more costly than necessary, and ill-suited for both hand and tool assembly. While some other prior technologies have addressed the phenomena of inefficient load application by creating special tools and driving surfaces, and other technologies have addressed material reduction by hollowing out the center of the hex head 102 through various means, while still other technologies have created three-cornered heads with special driving tools, none of these technologies have addressed the hex head 102 as a whole, considering the real current shape of the hex-head production part, as well as its interaction with tools in the industry. Current technology hex heads contain much more material than may be required for its intended purpose, and with material located in places that are hardly ideal for handling, and cost and weight reduction.

SUMMARY

According to the teachings of this disclosure, a fastener head may need only enough material, placed in the appropriate positions, such that it is capable of resisting the applied torque without failure, and transmitting this torque to resist an axial load.

According to one aspect of the invention, ahead configuration that is easier to grip with the thumb, forefinger and middle finger of one hand for hand insertion is provided, while maintaining the performance seen with hex-type heads in current assembly tooling. Such design may reduce the cost (material is roughly 50-60-percent of fastener cost) of current fastener head technologies. According to the teachings of this disclosure, surfaces may be created that may be more friendly to contact with the human hand, while removing those portions of a hex head that may not be necessary for application and transmission of torque, nor may they be necessary to resist axial loading, nor may they be necessary to axially stabilize the fastener head within current driving tooling.

According to a specific example embodiment of the disclosure, a fastener comprises: a threaded portion; a load-bearing platform attached to a proximal end of the threaded portion; three lugs attached to and positioned on the load-hearing platform at approximately 0, 120 and 240 degrees around a longitudinal axis through the threaded portion; and concave surfaces between the three lugs.

BRIEF DESCRIPTION OF THE DRAWINGS

A more complete understanding of the present disclosure may be acquired by referring to the following description taken in conjunction with the accompanying drawings wherein:

FIGS. 1(a) and 1(b) are schematic orthogonal diagrams of a prior technology flanged hex head and hex head fasteners;

FIGS. 2(a) and 2(b) are schematic plan diagrams of a prior technology hex head and tool used for rotation of the hex head;

FIG. 3 is a schematic orthogonal diagram of a prior technology hex head fastener showing contact areas for tightening and loosening the fastener;

FIG. 4 is a schematic plan diagram of the interrelationship between a hex head fastener and fingers of a hand;

FIGS. 8(a), 8(b), 9 and 10 show schematic orthogonal and plan diagrams of a three-point fastener head, according to a specific example embodiment of this disclosure;

Figure 5:
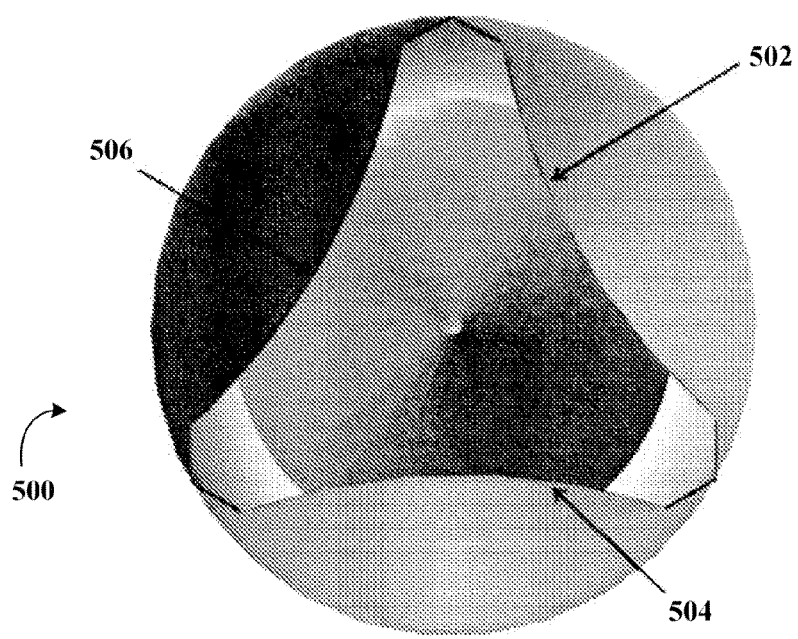
FIGS. 5 and 6 are schematic plan diagrams of a three-point fastener head, according to a specific example embodiment of this disclosure.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims.

DETAILED DESCRIPTION

Referring now to the drawing, the details of specific example embodiments are schematically illustrated. Like elements in the drawings will be represented by like numbers, and similar elements will be represented by like numbers with a different lower case letter suffix.

When a fastener head is held with the fingers of the human hand, the convex curved surfaces of the fingers may deform to match the contour of the surfaces being grasped, so that it may be more "finger friendly." While a variety of shapes can thus be accommodated by this deformation, a shape for gripping may be determined by the rigid portion of the fingers 406 and 408, or the thumb 404, e.g., their respective phalanges bones. Each of these bones is essentially cylindrical in shape and the soft tissue of the fingers may tend to form a fairly uniform layer surrounding it. A surface intended for contact with these fingers, therefore may mirror the finger shape, in order that load is more equally distributed about the finger/thumb surfaces.

Referring now to FIG. 5, depicted is a schematic plan diagram of a fastener head, according to a specific example embodiment of this disclosure. A fastener, generally represented by the numeral 500, has a head with a surface shaped for contact by each finger 404-408 during hand assembly of the fastener 500. The head of the fastener 500 may be provided with three surfaces 502, 504 and 506, each having a concave curved surface that essentially mirrors the shape of the human fingers. Preferably, each of the concave curved surfaces are large enough that it will comfortably mate with the largest of human thumbs, in order that large fingers do not feel excess loading at the extremes of the curve. It is anticipated and within the scope of this disclosure that this curve may have any contour that is essentially concave, or may be comprised of any combination of curved surfaces and/or flats that form an essentially concave curved surface between the corners (points) of the fastener head. As two fingers and a thumb, arranged in a diametrically opposed pattern, may be utilized for grasping and driving during hand assembly of the fastener, e.g., for example but not limited to, the three surfaces 502, 504 and 506 are located at intervals of approximately 120 degrees about the axis of the fastener 500.

Figure 6:
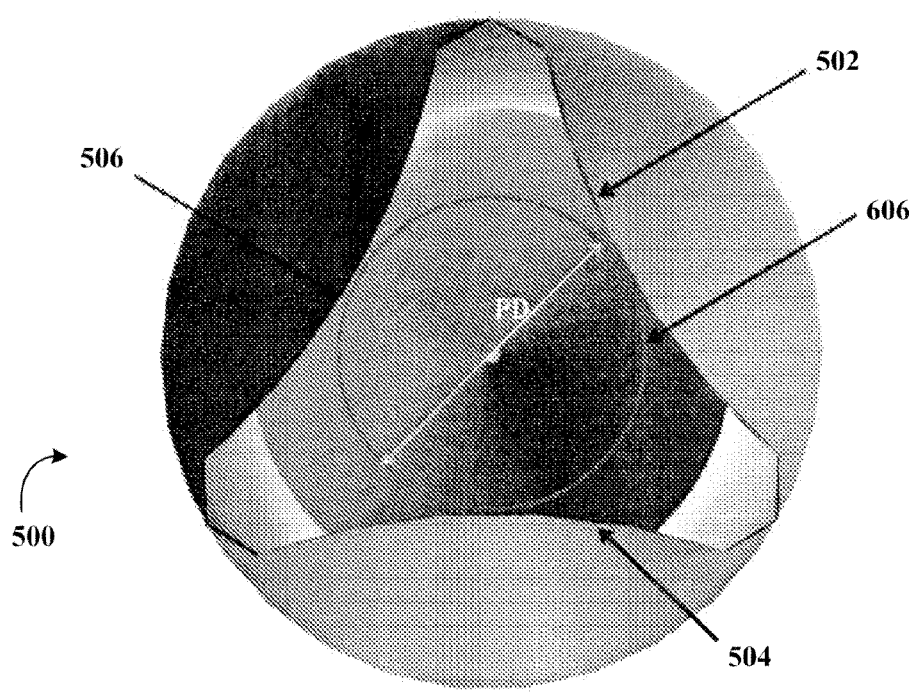

Referring now to FIG. 6, depicted is a schematic plan diagram of a fastener head according to FIG. 5. The fastener 500 may preferably be configured wherein each of the concave surfaces of its head is such that the innermost point of any such curve may not reach a point closer to the axis of the head than a circle 606 centered at the axis, whose diameter (PD) is defined by the pitch diameter of the thread of the fastener 500 (See FIG. 7). This configuration may allow ease in manufacturing at a lower cost, although it is anticipated and within the scope of this disclosure that said point may fall at any distance from the axis that defines a concave surface.

A specific edge configuration on the top edge of each of the three surfaces 502, 504 and 506 may facilitate alignment of the phalanges bones of the fingers 404, 406 and 408 in such a way that each finger is directed toward the axis of the fastener 500 as they approach the base of each of the fingers 404, 406 and 408. Thus, as force is applied with the fingers 404, 406 and 408 to drive (rotate) the above combination of surfaces 502, 504 and 506, the phalanges bones may align therewith. This alignment may minimize point loading on any portion of the soft tissue covering the finger bones.

Figure 7:
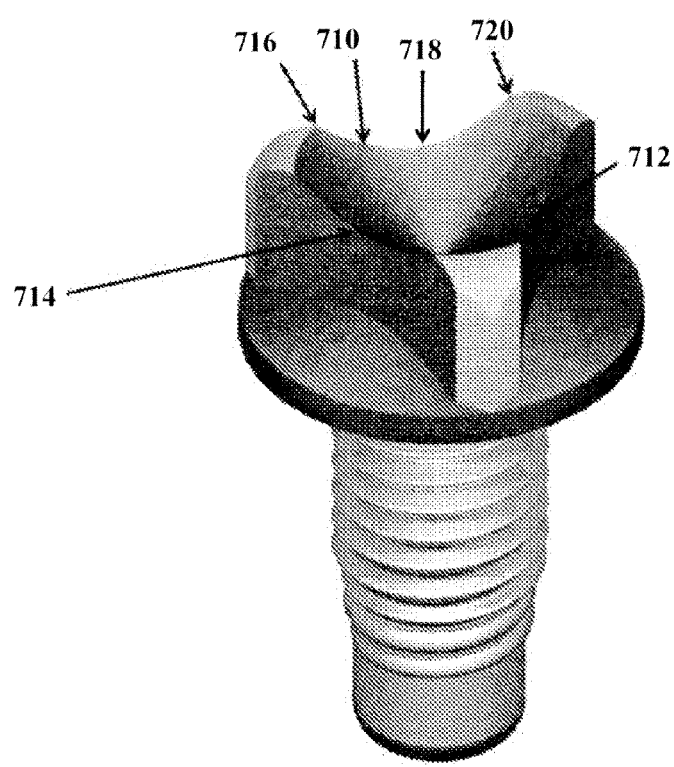
FIG. 7 is a schematic orthogonal diagram of the fastener head shown in FIGS. 5 and 6, according to a specific example embodiment of this disclosure.

Referring now to FIG. 7, depicted is a schematic orthogonal diagram of the fastener head shown in FIGS. 5 and 6. A top edge of each of the three driving surfaces described above may be truncated in a smoothly curved edge as shown in FIG. 7, these smoothly curved edges being represented by the numerals 710, 712 and 714. Each of these edges 710, 712 and 714 may form a relief whose curve traverses from a high point at a top end of a surface corner (e.g., corner 716) to a minimum height close to the center of the face (e.g., center 718) of the respective driving face surface, and back again to a similar high point on the opposite end of the top of an adjacent face surface (e.g., corner 720). It is contemplated herein and within the scope of this disclosure that such a relief curve may be made up of any combination of curves and flats that present an edge that may be "finger friendly," e.g., comfortable for contact with the soft tissue of the fingers.

As noted hereinabove, during fastening and unfastening of prior technology hex shaped fasteners 100 (FIGS. 1-4), contact between the external tool 220 and the fastener hex head 102 may take place only on approximately ten percent of the area of the facet, in the area directly adjacent to the hex corner (e.g., rectangular areas 312 and 314). As such, only this portion of the original facet area may be needed to maintain the advantages and function of the present technology hex head fasteners. Thus, only the existing corners of the hex, plus a small additional area adjacent to each of the corners, (intended to compensate for material and dimensional variations), may be needed for tool contact. These areas are shown in FIG. 3 for the current technology hex head fasteners and are represented by the number 312 for assembly (fastening) and the number 314 for removal (unfastening).

Referring now to FIGS. 8(*a*) and 8(*h*), likewise, the areas 812 and 814 are present on either side of the corners represented by the numerals 840, 842 and 844. It is contemplated and within the scope of this disclosure that such area(s) may take any shape that efficiently provides adequate contact areas for standard tools, and/or may be significantly larger. One having ordinary skill in the art of designing and manufacturing fasteners and having the benefit of this disclosure would understand the benefits of an unlimited variety of shapes of the facet surfaces that may be employed in reducing the amount of material necessary in manufacturing the fastener while still maintaining compatibility with existing driver tools.

Tool contact on six planes described in the prior hex fastener technology stabilizes the fastener such that it does not rock appreciably during installation with current assembly tools. The stability of the fastener relative to the tool may be influenced by the interaction of these planes with the tool. Instability may occur if the angle of a plane is dramatically changed, e.g., by five or more degrees, or reduced such that only point contact is possible. Thus, according to the teachings of this disclosure, such stability is not significantly degraded by reducing the number of contact planes from six to three, particularly if they remain spaced equally about the periphery of the fastener head. For example, in the embodiment illustrated in FIGS. 8(*a*) and 8(*b*), the corners 840, 842, and 844 are positioned about 120 degrees from each other. As such, three of the driving planes found in conventional hex head fasteners are eliminated.

The removal of contact planes from conventional hex head fasteners may not necessarily require additional contact area(s) to be added to any of the remaining three planes, as the remaining surfaces are capable of transmitting the required torque without significant additional deformation. As such, according to the teachings of this disclosure, the use of the three diametrically opposed finger contact surfaces 502, 504 and 506 (FIGS. 5 and 6), in combination with three corners 840, 842 and 844 (each corner having areas 812 and 814) described herein, may be sufficient to improve hand assembly while not degrading tool assembly performance. A further improvement for comfort in hand assembly may be the addition of the curved edges 710, 712 and 714. These head configurations may also be manufactured with less material compared to conventional hex heads.

Figure 9:
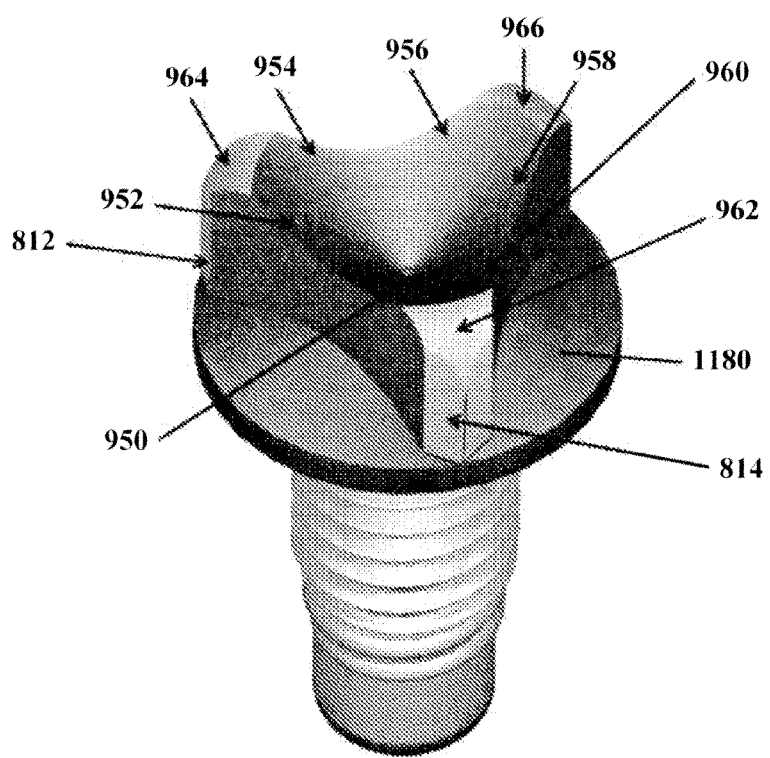

Referring now to FIG. 9, in addition, the transmission of torque applied to the three remaining planes may not cause deformation or failure of the fastener head. Accordingly, creation of a plurality of localized structural ribs 950, 952, 954, 956, 958 and 960, each rib located such that it opposes the loading applied to each of the rectangular areas 812 and 814 as described above, is contemplated herein and within the scope of this disclosure. In each corner of the head, the combination of assembly (fastening) and removal (unfastening) areas 812 and 814, and supporting structural ribs 950-960 shall be referred to hereinafter, for ease of description, as "lugs" 962, 964 and 966.

Each structural rib, e.g., rib 950, may preferably be located between a tightening (fastening) area (plane) 812 of one lug 964 and the loosening (unfastening) area (plane) 814 from another lug 962. A specific example configuration is shown, with the rib 950 may support the loosening (unfastening) area (plane) 814 of lug 962 integrated with the rib 952 intended to support tightening from lug 964, etc., thus forming common ribs between each lug. It is contemplated herein and within the scope of this disclosure that the outermost surfaces of these integrated ribs may be concave, e.g., surfaces 502, 504 and 506 shown in FIG. 5.

The innermost surfaces of the ribs 950-960 may take any shape that, in combination with the outermost concave surfaces, result in a rib that is capable of resisting the maximum assembly or removal torque applied to each of the lugs 962, 964 and 966. It is contemplated herein and within the scope of this disclosure that, for example, rib 950 may also be totally separate from the adjoining rib 952, so long as it adequately supports the resistance of torque applied to the areas 812 and 814 (planes) of its respective lug. In some cases, this specific example embodiment may be easier to manufacture than non-integrated rib embodiments.

Figure 10:
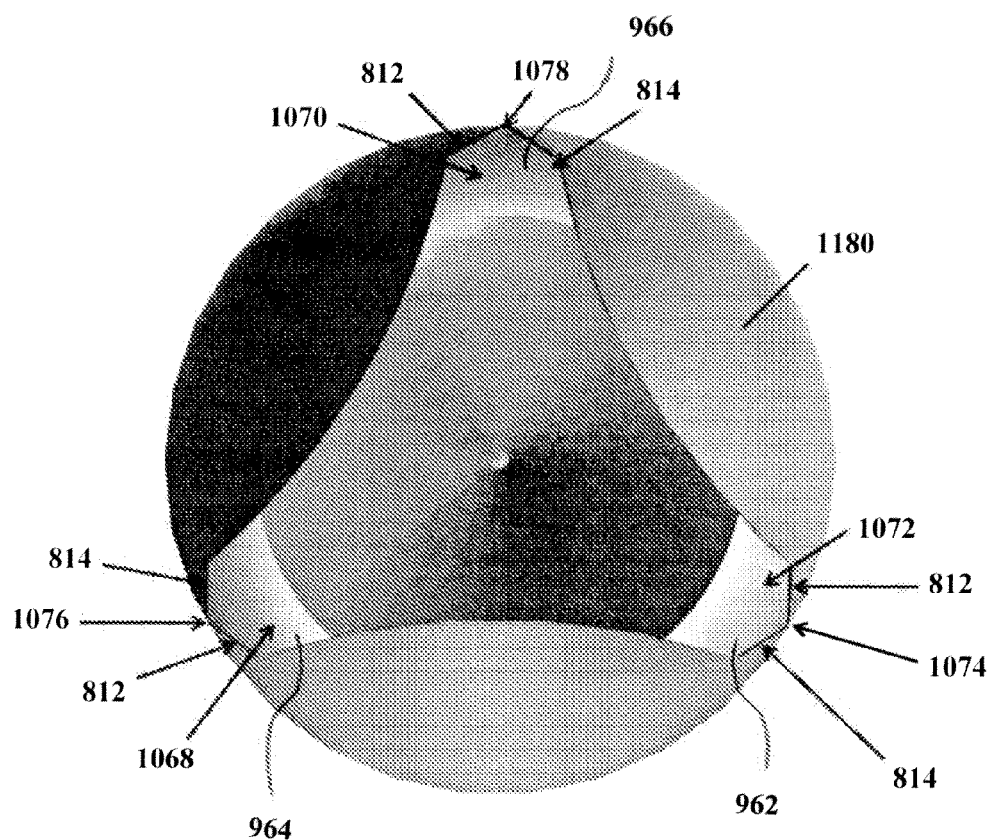

Referring now to FIG. 10, depicted is schematic plan diagram of a fastener head, according to a specific example embodiment of this disclosure. Lugs 962, 964 and 966 preferably truncate at their top surfaces 1068, 1070 and 1072 in a convex curve essentially tangent to a plane substantially perpendicular to the thread axis, located at the top of the fastener, as well as essentially tangent to the lines 1074, 1076 and 1078 formed by the intersection of the pairs of assembly (fastening) area (planes) 812 and their respective adjacent removal (unfastening) area (planes) 814. Such curves may aid insertion of the head into assembly tooling and it is contemplated and within the scope of this disclosure that such curves may take any essentially convex three-dimensional shape, according to the teachings of this disclosure.

As shown in FIGS. 5 and 10, nine exterior surfaces 502, 504, 506, and 812 and 814 (times three) wherein any axial section through the fastener results in an intersection line which is essentially parallel to the axis. It is contemplated herein and within the scope of this disclosure that all such exterior surfaces described herein may be canted slightly inboard (toward the fastener axis) as they approach the top of the head, such as to create a draft angle on each, thus allowing more efficient manufacture.

In some embodiments, a center portion of the fastener head described herein may be evacuated of material not substantially contributing to the functions stated hereinabove and/or for structural purposes. This may be done by utilizing any geometric shape which hollows out a center of the head, thus saving material and weight.

Figure 11:
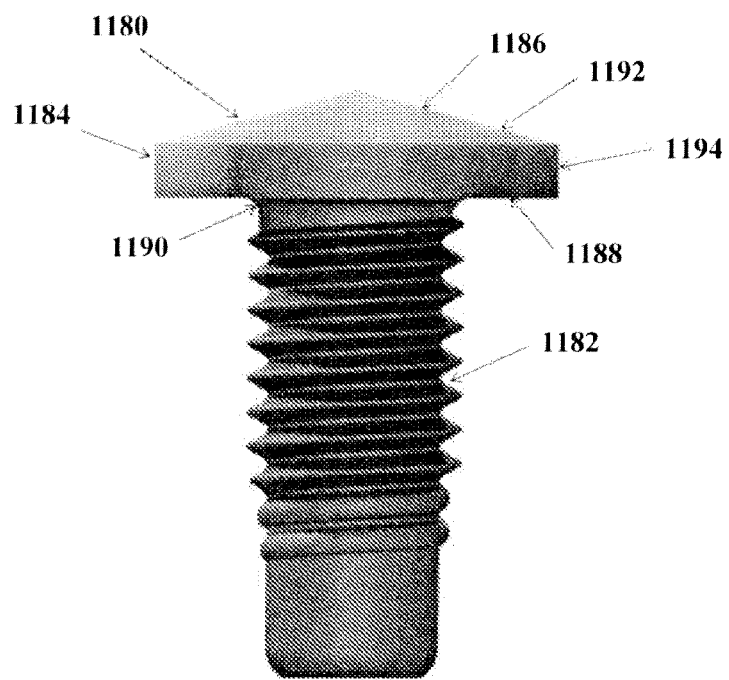
FIG. 11 is a schematic elevational diagram of a load-hearing platform attached to the threaded portion of the fastener, according to a specific example embodiment of this disclosure.

Referring now to FIG. 11, depicted is a schematic elevational diagram of a load-bearing platform attached to the threaded portion of the fastener, according to a specific example embodiment of this disclosure. All of the above described features of the head, according to the teachings of this disclosure, may be placed onto the upper surface of a load-bearing platform attached to the threaded portion of the fastener. Such platform 1180 and adjacent threaded body 1182 are shown for illustrative purposes without the head as described hereinabove. In a specific example embodiment of this disclosure, construction of such a platform 1180 may have a substantially cylindrical shape, represented by the numeral 1184, with a conical upper portion 1186 that intersects the fastener head, described more fully hereinabove. In a preferred construction, a lower surface 1188 of the cylindrically shaped platform 1180 may be slightly conical and may intersect with the thread body 1182 in a radius, represented by the numeral 1190. It is contemplated and within the scope of this disclosure, that the contour and conical nature of the top surface 1192, the shape of outer edge 1194, the angularity and contour of the lower surface 1188, and the means of intersection with the thread body 1182 may vary according to individually design requirements, as would be readily apparent to a person having ordinary skill in the art of threaded fastener design and having the benefit of this disclosure. The diameter of the cylindrical platform 1180 may vary from a minimum determined by about a diameter of the fastener shank, to a maximum of about two times the circle's diameter, e.g., similar to the integrated flange 104 shown in FIG. 1. In some embodiments, the diameter of the cylindrical platform 1180 may be larger than a circle circumscribed by the corners of the head (intersections of areas 812 and 814).

The platform 1180 may be thick enough so as to be capable of resisting the design loads associated with the threaded body 1182 without failure, however, it is contemplated herein and within the scope of this disclosure that it may be much thicker as determined by individual design requirements.

Figure 12:
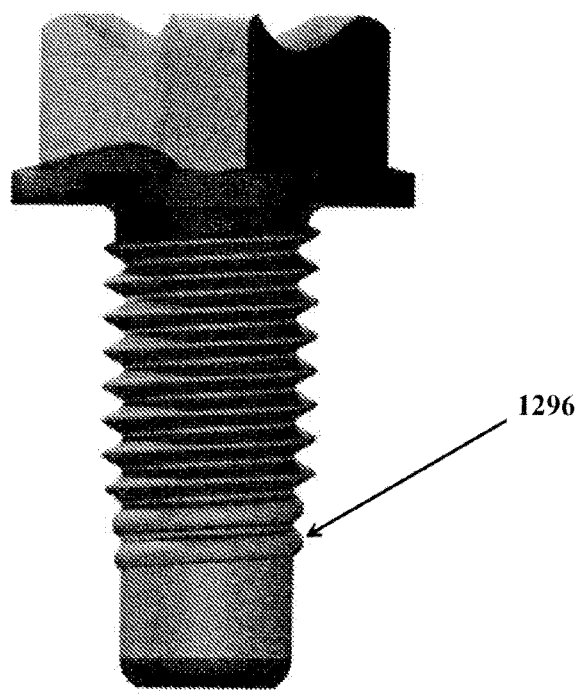
FIG. 12 is a schematic elevational diagram of a three-point fastener head in combination with an anti-cross threading body, according to another specific example embodiment of this disclosure.

It is contemplated herein and within the scope of this disclosure that substantially all current thread designs and point styles may be used in combination with the fastener head disclosed hereinabove, particularly standard threads as described in international standards such as ISO and IFI. Of particular effectiveness in improving assembly efficiency is the integration of the head style, according to the teachings of this disclosure, with anti-cross thread designs 1296, as shown in FIG. 12, and more fully described in U.S. Pat. Nos. 5,730,566; 5,791,849; 5,836,731; 5,997,231; and 6,162,001; all of which are incorporated by reference herein for all purposes, and marketed under the trade names MAThread® and MATpoint® (Registered trademarks of MAThread, Inc., 28061 Grand Oaks Court, Wixom, Mich. 48393) and other similar designs.

Figure 13:
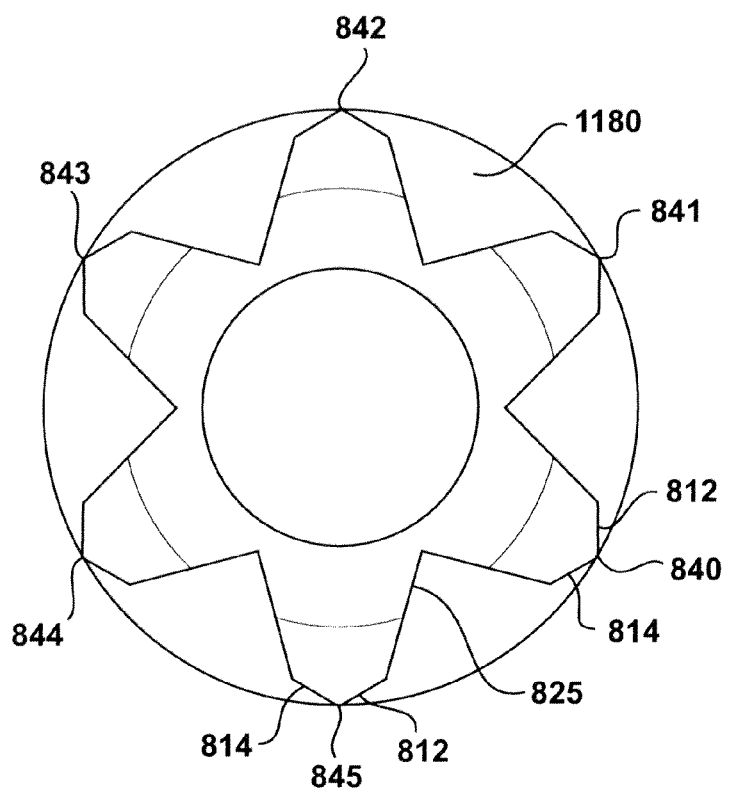
FIG. 13 shows a plan diagram of a six-point fastener head of the present invention, according to a specific example embodiment of this disclosure

Referring now to FIG. 13, depicted is a schematic plan diagram of a fastener head, according to a specific example embodiment of this disclosure. This embodiment of the invention is a six-point or six-lug head having six corners 840, 841, 842, 843, 844, and 845 for engagement with a conventional box-end wrench or socket tool. Between corners and opposite assembly (fastening) area (planes) 812 and removal (unfastening) area (planes) 814, material does not exist compared to facets in conventional hex heads, such that recesses 825 are formed. Embodiments many have anywhere between one and six recesses 825. Six-point head embodiments may or may not employ a platform 1180. Embodiments may or may not have material in a central portion of the head.

Figure 14A:
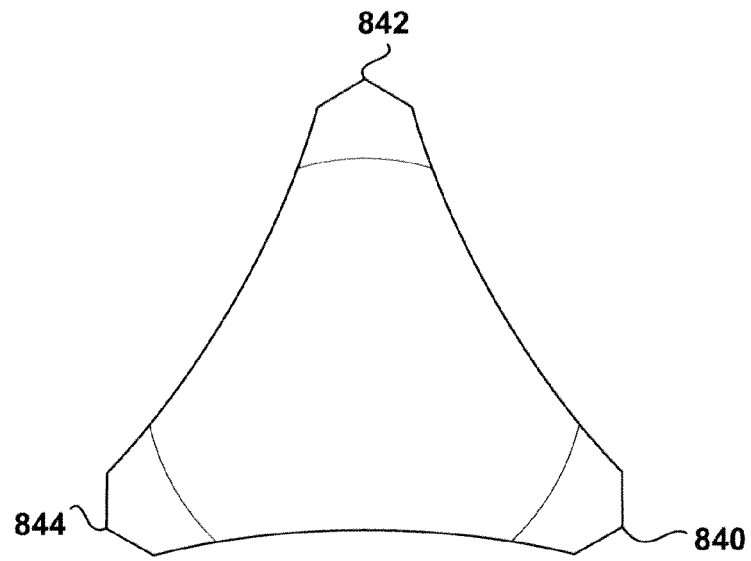
FIG. 14(a) is a plan diagram of a three-point fastener head of the present invention, wherein the fastener head does not have a platform.
Figure 14B:
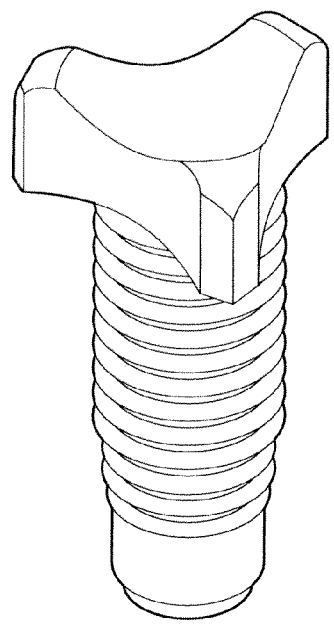
FIG. 14(b) is a orthogonal view of the fastener of FIG. 14(a)

Referring now to FIGS. 14(a) and 14(b), plan and perspective views of a three-point or three-lug embodiment are illustrated. This embodiment is similar to those described relative to FIGS. 8(a) and 8(b) comprising three points or corners 840, 842 and 844, except that this embodiment does not comprise a platform 1180 (see FIG. 11). Embodiments may or may not have material in a central portion of the head.

Figure 15A:
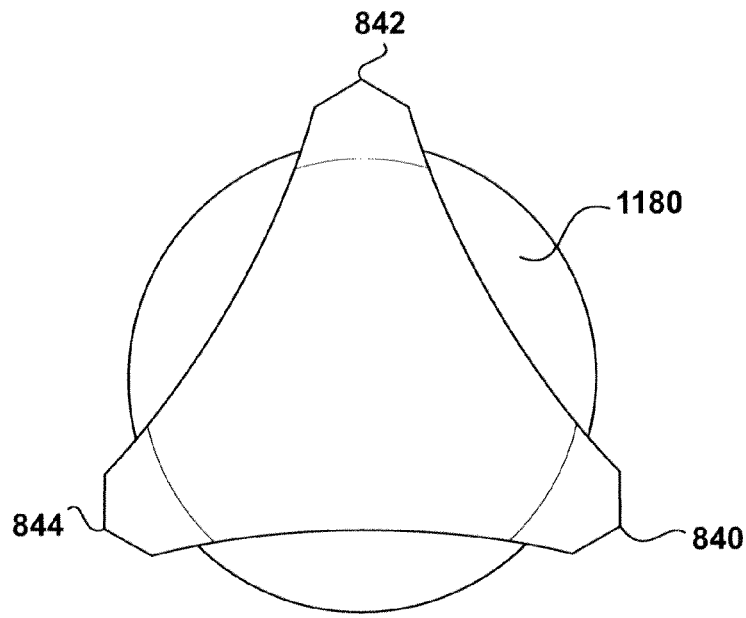
FIG. 15(a) is a plan diagram of a three-point fastener head of the present invention, wherein the fastener head does have a platform with a radius smaller than a circle encompassing the points of the fastener head.
Figure 15B:
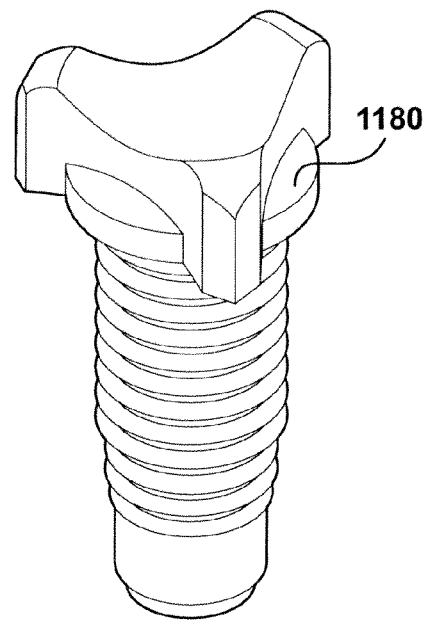
FIG. 15(b) is a orthogonal view of the fastener of FIG. 15(a)

Referring now to FIGS. 15(a) and 15(b), plan and perspective views of a three-point or three-lug embodiment are illustrated. This embodiment is similar to those described relative to FIGS. 8(a) and 8(b) comprising three points or corners 840, 842 and 844, except that this embodiment comprises a platform 1180 that has a diameter between the pitch diameter and a circle circumscribed by the corners of the head (intersections of areas 812 and 814). Embodiments may or may not have material in a central portion of the head.

Figure 16:
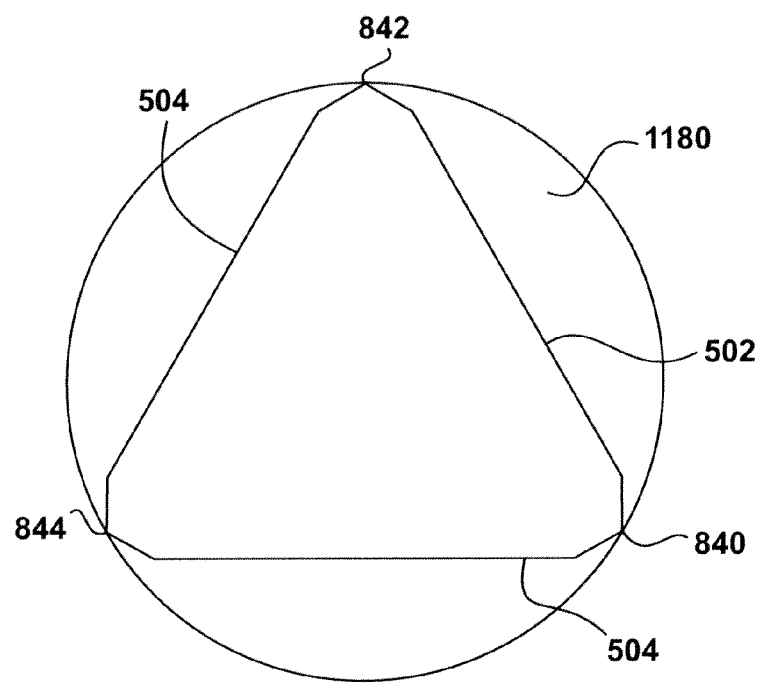
FIG. 16 is a plan view of a three-point fastener head of the present invention, wherein the facets between the points or corners comprise flat surfaces.

Referring now to FIG. 16, a plan view of a three-point or three-lug embodiment is illustrated. This embodiment is similar to those described relative to FIGS. 8(a) and 8(b) comprising three points or corners 840, 842 and 844, except that this embodiment comprises a platform 1180 that has a diameter about equal to a circle circumscribed by the corners of the head (intersections of areas 812 and 814) and the facets (502, 504, 506) between the corners are substantially planar. However, in alternative embodiments, these surfaces may be straight or convex, or any combination of surfaces. Embodiments may or may not have material in a central portion of the head.

Figure 17:
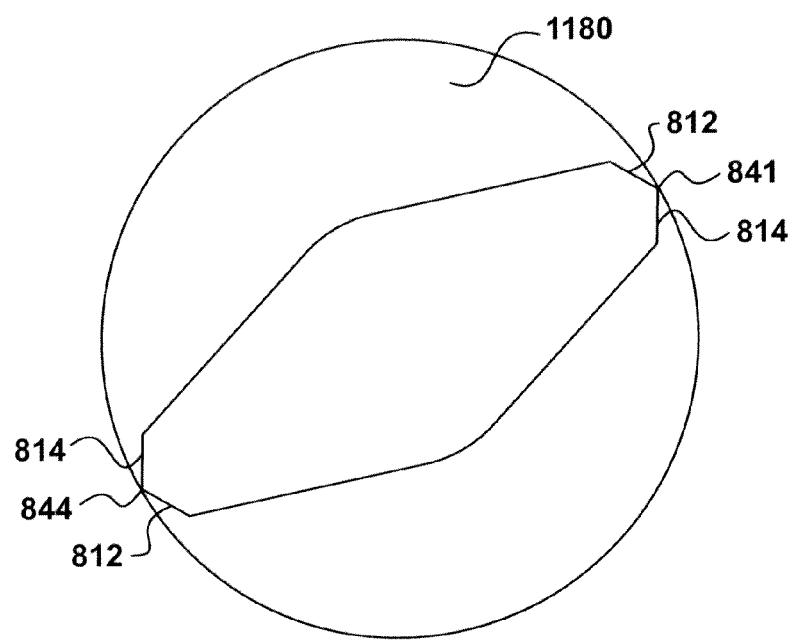
FIG. 17 is a plan view of a two-point fastener head of the present invention, wherein the facets between the points or corners comprise convex surfaces.

Referring now to FIG. 17, a plan view of a two-point or two-lug embodiment is illustrated. This embodiment has only two corners 841 and 844, wherein the corners 841 and 844 are positioned about 180 degrees from each other. Each corner 841 and 844 is formed by an intersection of areas 812 and 814. Different two-point embodiments may have no platform at all and other embodiments may have a platform 1180 of any diameter. In the illustrated embodiment, the facets extending between opposite areas 812 and 814 are planar, but in further embodiments, the facets may be any shape. Embodiments may or may not have material in a central portion of the head.

Figure 18:
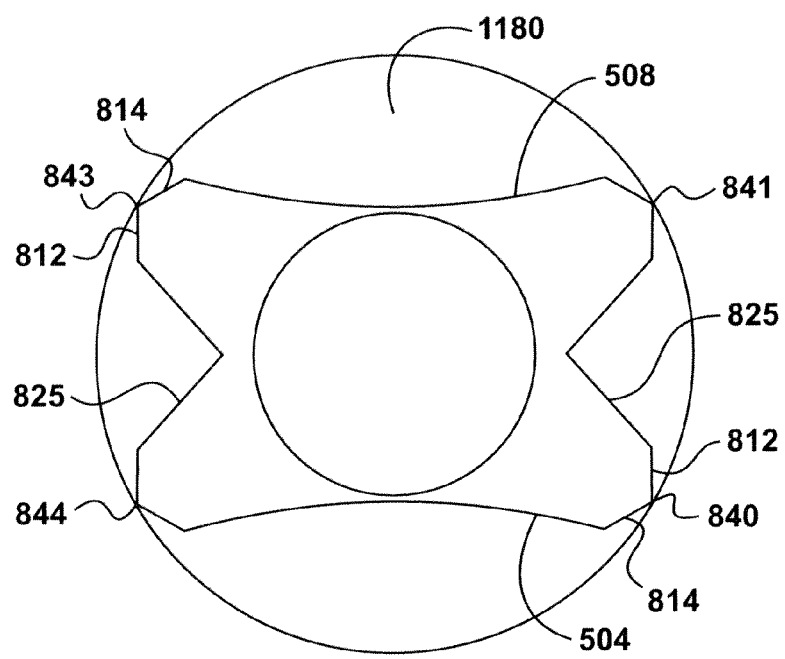
FIG. 18 is a plan view of a four-point fastener head of the present invention, wherein recesses and concave facets extend between the points or corners.

Referring now to FIG. 18, a plan view of a four-point or four-lug embodiment is illustrated. This embodiment has four corners 840, 841, 843, and 844, wherein the corners 840, 841, 843, and 844 are positioned at 0 degrees, 60 degrees, 180 degrees, and 240 degrees respectively. Each corner 840, 841, 843, and 844 is formed by an intersection of areas 812 and 814. Different four-point embodiments may have no platform at all and other embodiments may have a platform 1180 of any diameter. In the illustrated embodiment, the surfaces extending between opposite areas 812 and 814 of a pair of relatively adjacent corners (840 and 841 as a first pair, and 843 and 844 as a second pair) form recesses 825 such that material does not exist compared to facets in conventional hex heads. In the illustrated embodiment, the surfaces 508 and 504 extending between opposite areas 812 and 814 of a pair of relatively opposite corners (840 and 844 as a first pair, and 841 and 843 as a second pair) are concave. However, in alternative embodiments, these surfaces may be straight or convex, or any combination of surfaces. Embodiments may or may not have material in a central portion of the head.

Figure 19:
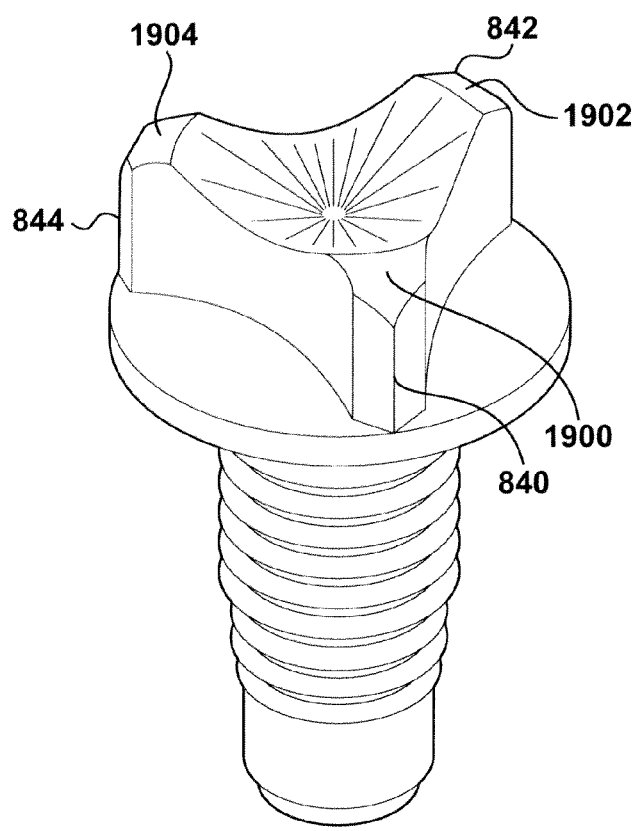
FIG. 19 shows a schematic orthogonal diagram of a three-point fastener head, according to a specific example embodiment of this disclosure, wherein the upper surfaces of the corners define a cone shape.

Referring now to FIG. 19, a perspective view of a three-point or three-lug embodiment is illustrated. This embodiment is similar to those described relative to FIGS. 8(a) and 8(b) comprising three points or corners 840, 842 and 844. A particular feature of this embodiment is that the top surfaces 1900, 1902 and 1904 of the lugs are relatively more planar compared to those of the other illustrated embodiments. In particular, the top surfaces 1900, 1902 and 1904 shown in FIG. 19 are somewhat conical, wherein they collectively define portions of a conical shape such that if one were to imagine a conical structure, like a lamp shade, placed on top of the head, it would contact all points of the top surfaces 1900, 1902 and 1904 of the lugs. Further, this embodiment has the material hallowed out of a central portion of the head.

Figure 20:
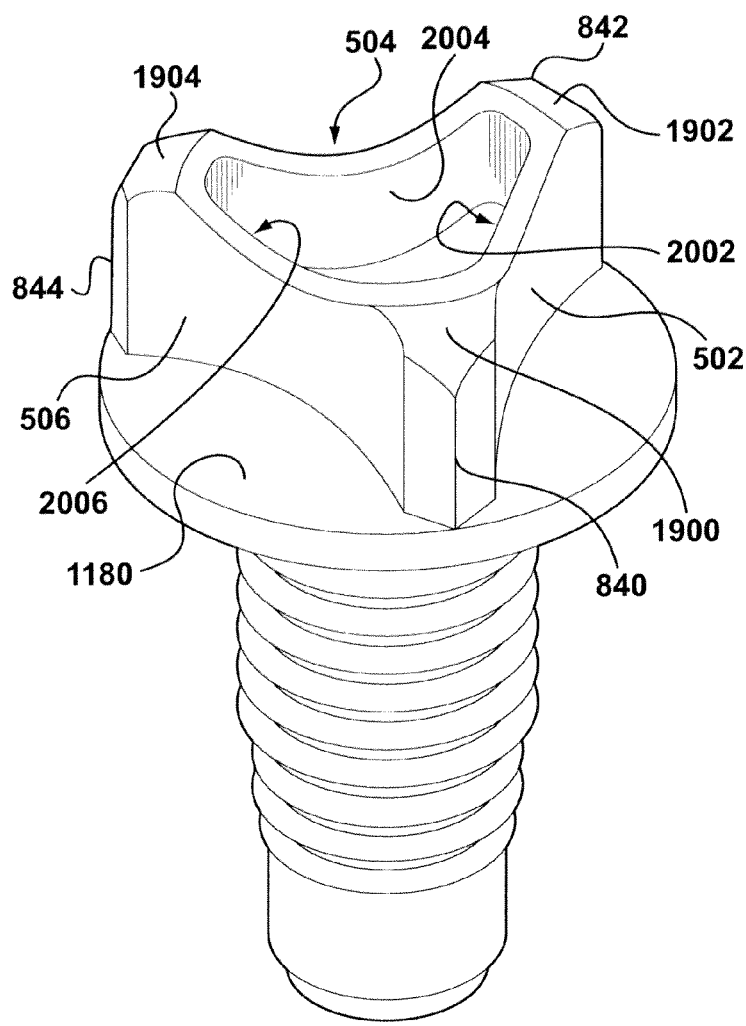
FIG. 20 shows a schematic orthogonal diagram of a three-point fastener head, according to a specific example embodiment of this disclosure, wherein the hallowed out portion of the head has a triangular or trilobular shape.

Referring now to FIG. 20, a perspective view of a three-point or three-lug embodiment is illustrated, wherein the hollowed out portion of the head has a somewhat triangular or trilobular shape. In particular, interior sides 2002, 2004 and 2006 of the hollowed out portion are somewhat parallel to the exterior facets 502, 504 and 506.

A process for manufacturing bolts, in particular bolt heads, involves pressing metal blanks into a die. As a metal blank is pressed into a die, the metal flows into the deepest crevices and corners of the die to form the most distal end portions of the lugs of the head which are farthest away from the platform. The hallowed out portions of the heads between the lugs illustrated in this disclosure may be formed by dies that displace metal from the center of the head outwardly toward the distal portions of the lugs. Of course, the shape of the central portion of the die defines in reverse the shape of the hallowed out central portion of the head. The shape of the central portion of the die, and thus the shape of the hallowed out central portion of the head may take any shape. As shown in FIG. 19, the shape is conical. As shown in FIG. 20, the shape is somewhat triangular or trilobular and the interior sides 2002, 2004 and 2006 of the hollowed out portion are somewhat parallel to the exterior facets 502, 504 and 506. A hallowed out portion of this triangular or trilobular may be advantageous as it allows the metal from the blank to flow evenly and completely to form the most distal portions of the head extending from the platform 1180.

In different embodiments, the height of the head walls, formed by the interior sides 2002, 2004 and 2006 and the exterior facets 502, 504 and 506, may be different than the height of the lugs. In some embodiments, the height of the head walls is shorter than the lugs, while in other embodiments, the head walls are taller than the lugs. In still further embodiments, the head walls are the same height as the lugs.

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

What is claimed is:

1. A fastener, comprising:
a threaded shank having a central longitudinal axis and defining a pitch diameter;
exactly three lugs extending from and positioned on an end of the threaded shank at approximately 0, 120 and 240 degrees around the central longitudinal axis of the threaded shank, wherein each of the lugs comprises:
a radially-outward end portion comprising:
a tightening surface; and
a loosening surface;
wherein the tightening surface and loosening surface are angularly offset from each other and meet at a corner; and
wherein the tightening and loosening surfaces are configured to be driven by a rotation of a hex head tool in a tightening rotational direction and a loosening rotational direction, respectively;
a first structural rib extending between the tightening surface of one lug and the loosening surface of another lug, and a second structural rib extending between the tightening surface of one lug and the loosening surface of another lug,
wherein radially-outwardly-facing surfaces of the first and second structural ribs do not extend closer to the central longitudinal axis than the pitch diameter; and
a platform,
wherein the threaded shank extends from one side of the platform and the lugs extend from an opposite side of the platform, wherein a diameter of the platform is substantially the same as a diameter defined by the corners defined at the radially-outward end portions of the three lugs.

2. The fastener of claim 1, wherein the radially-outwardly-facing surfaces of the first and second structural ribs are adapted to comfortably mate with human fingers.

3. The fastener of claim 1, wherein the radially-outwardly-facing surfaces of the first and second structural ribs are curved.

4. The fastener of claim 1, wherein each of the radially-outwardly-facing surfaces of the first and second structural ribs comprises a plurality of flat surfaces arranged as a curve.

5. The fastener of claim 1, wherein each of the radially-outwardly-facing surfaces of the first and second structural ribs comprises a plurality of flat surfaces and a plurality of curved surfaces arranged together as a curve.

6. The fastener of claim 1, wherein a diameter of the platform is greater than a diameter defined by the corners defined at the radially-outward end portions of the three lugs.

7. The fastener of claim 1, wherein the platform has an upper surface from which the lugs and extend, wherein the lugs define a tri-lobular perimeter on the upper surface of the platform.

8. The fastener of claim 1, wherein the threaded portion comprises anti-cross threads.

9. The fastener of claim 1, comprising a head in which the three lugs are formed, wherein the head defines a center portion having a generally concave bowl-shaped depression extending toward the threaded shank.

10. The fastener of claim 9, wherein the bowl-shaped depression has a generally triangular or trilobular shape.

11. The fastener of claim 1, wherein each tightening and loosening surface is planar.

12. A fastener, comprising:
a threaded shank having a central longitudinal axis and defining a pitch diameter;
exactly three lugs extending from and positioned on an end of the threaded shank at approximately 0, 120 and 240 degrees around the central longitudinal axis of the threaded shank, wherein each of the lugs comprises:
a radially-outward end portion comprising:
a tightening surface; and
a loosening surface;
wherein the tightening surface and loosening surface are angularly offset from each other and meet at a corner; and
wherein the tightening and loosening surfaces are configured to be driven by a rotation of a hex head tool in a tightening rotational direction and a loosening rotational direction, respectively;
a first structural rib extending between the tightening surface of one lug and the loosening surface of another lug, and a second structural rib extending between the tightening surface of one lug and the loosening surface of another lug,
wherein radially-outwardly-facing surfaces of the first and second structural ribs do not extend closer to the central longitudinal axis than the pitch diameter, wherein each tightening and loosening surface is rectangular.

* * * * *